United States Patent
Ling, III et al.

(10) Patent No.: US 9,280,531 B2
(45) Date of Patent: Mar. 8, 2016

(54) MARKETING TO CONSUMERS USING DATA OBTAINED FROM ABANDONED ELECTRONIC FORMS

(71) Applicant: MOV DIGITAL MEDIA, INC., Anaheim, CA (US)

(72) Inventors: Thomas Chow Ling, III, Yorba Linda, CA (US); Peter Iveson Norton, Yorba Linda, CA (US)

(73) Assignee: MOV DIGITAL MEDIA, INC., Anaheim, CA (US)

( * ) Notice: Subject to any disclaimer, the term of this patent is extended or adjusted under 35 U.S.C. 154(b) by 92 days.

(21) Appl. No.: 14/307,951

(22) Filed: Jun. 18, 2014

(65) Prior Publication Data

US 2015/0149878 A1    May 28, 2015

Related U.S. Application Data

(60) Provisional application No. 61/908,349, filed on Nov. 25, 2013.

(51) Int. Cl.
*G06F 17/24* (2006.01)
*G06F 17/27* (2006.01)
*G06Q 30/02* (2012.01)

(52) U.S. Cl.
CPC .......... *G06F 17/243* (2013.01); *G06F 17/2705* (2013.01); *G06Q 30/02* (2013.01); *G06Q 30/0271* (2013.01)

(58) Field of Classification Search
None
See application file for complete search history.

(56) References Cited

U.S. PATENT DOCUMENTS

| | | | | |
|---|---|---|---|---|
| 2003/0144925 A1* | 7/2003 | Greenberg | ........... | G06Q 10/107 705/26.8 |
| 2005/0278231 A1* | 12/2005 | Teeter | .................. | G06Q 10/107 705/14.51 |
| 2009/0193116 A1* | 7/2009 | Clucas | .................... | G06Q 30/02 709/224 |
| 2014/0068409 A1* | 3/2014 | Hicks | ..................... | G06F 9/4443 715/234 |

* cited by examiner

*Primary Examiner* — Asher Kells
(74) *Attorney, Agent, or Firm* — Knobbe, Martens, Olson & Bear, LLP

(57) ABSTRACT

Visitors that abandon electronic or computer-generated forms before completing and submitting the form are lost to business entities. Data obtained from abandoned electronic or computer-generated forms is used to identify these lost visitors. Sometimes a unique script embedded on the webpages scrapes the data from the forms. The obtained data is further utilized to market or remarket to the lost consumers by sending personalized messages via a preferred communication medium. Electronic form events can be tracked and the obtained data and the event tracking information can be compiled into reports. Patterns in the obtained data can be evaluated to provide revisions to the electronic forms.

14 Claims, 9 Drawing Sheets

<!-- START CONSUMER-OLOGY SCRIPT --> 902

< script type = "text/javascript" > 904 var mvProtocol = (("https:" == document.location.protocol) ? "https://" : "http://"); 906 document.write (unescape ("%3Cscript src='" + mvProtocol + "consumer-ology.com scripts/_____.js' type='text/javascript'%3E%3C/script%3E")); 908

</script> 910

<!-- END CONSUMER-OLOGY SCRIPT --> 912

MARKETING TO CONSUMERS USING DATA OBTAINED FROM ABANDONED ELECTRONIC FORMS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Business entities lose thousands of on-line prospective consumers each day. Typically, a consumer accesses a website provided by the business entity and begins the process of entering information into an electronic or computer-generated form. Often the consumer fails to complete the form. Sometime the consumer may enter an email address or other personal information. Other times, the consumer may exit the form without entering any information. These consumers may not complete a transaction for a variety of reasons that are often unknown to the business entity. For example, the form may request data that is not immediately known to the consumer. A website may utilize multiple forms and consumers often grow tired of the forms. In other examples, a consumer may feel that the forms are requesting private information that the consumer desires not to disclose. In still other examples, the consumer may realize during the process that the type of good or service associated with a given form is not what the consumer desires. Consequently, these lost consumers typically result in lost revenues for the business entity.

SUMMARY

System and methods are disclosed to retrieve data from partially completed electronic forms and use the retrieved data to identify the consumer who accessed the electronic form. In one embodiment, the data is retrieved by data scraping. When the scraped data does not identify the consumer, the system accesses one or more databases to look up identifying information based at least in part on the scraped data.

Further, systems and methods are disclosed to provide intelligent marketing to the consumers based on the scraped data and the additional identifying information. In one embodiment, the system further comprises an intelligent marketing matrix module that is configured to determine a preferred method of communication. For example, the intelligent marketing matrix module will determine whether to send an email, a text message, or printed material through direct mail to the lost consumer. In another embodiment, the intelligent marketing matrix takes into account the consumer's preferences or the preferences of the business entity associated with the electronic form. For example, if the business entity only wants to contact lost consumers through email, then that will override the determination of whether to send an email, a text message, or printed material through direct mail.

The system then sends to the consumer, using one or more of the preferred methods of communication, a reminder, an incentive such as electronic coupon, information about the desired products and services, discount notifications, or an offering for a similar product or service, etc. In one or more embodiments, the system also generate reports including by way of example, the identities of the abandoning consumers, consumer's names, email addresses and account status. Other reports may include the number of completed forms, number of abandoned forms, and the number of abandoning consumers that have been subsequently contacted.

Certain embodiments relate to a method to market to consumers with data obtained from abandoned electronic forms. The method comprises determining that an electronic form accessed by a user has been abandoned by the user, obtaining data from the abandoned electronic form, and sending a personalized message to the user based at least in part on the obtained data. In an embodiment, the electronic form does not include a payment gateway. In another embodiment, the method further comprises determining when the electronic form has been abandoned by the user. In a further embodiment, the method further comprises embedding script in webpage of a website comprising the electronic form. In a yet further embodiment, obtaining data from the abandoned electronic form comprises scraping the data from the abandoned electronic form using the script. In an embodiment, the obtained data provides an indication of a preferred communication medium of the user and the personalized message is sent to the user via the preferred communication medium.

According to a number of embodiments, the disclosure relates to a method market to consumers with data obtained from abandoned electronic forms. The method comprises determining that an electronic form accessed by a user has been abandoned by the user, where the electronic form has embedded computer-executable instructions and one or more fields configured to accept user-entered text, and comprises at least one hypertext markup language (HTML) element associated with the one or more fields. The at least one HTML element has at least one attribute. The method further comprises obtaining data from the abandoned electronic form with the embedded computer-executable instructions by building a data structure based on the abandoned electronic form, parsing the data structure to obtain the at least one HTML element, storing one or more of the at least one HTML element, the at least one attribute, and the user-entered text, determining identifying information of the user based at least in part on the user-entered text, identifying a preferred communication medium of the user, and sending a personalized message to the user based at least in part on the identifying information via the preferred communication medium to entice the user to complete the electronic form. In an embodiment, the method further comprises sending a message to the Internet protocol (IP) address associated with a computing device used to access the electronic form when the identifying information of the user cannot be determined. In another embodiment, the preferred communication medium comprises one or more of an email, a text message, printed material sent through direct mail, and a message on a social media site. In a further embodiment, the personalized message comprises one or more of a coupon, a reminder, information related to the electronic form, discount notifications, an offering related to the electronic form, a link to return to a webpage comprising the electronic form, a lightbox image, and an advertisement. In a yet further embodiment, the personalized message is sent to the user within approximately one minute after determining that the user abandoned the electronic form. In an embodiment, the method further comprises tracking electronic form events with one or more of an IP address, a user agent, and a timestamp to create event tracking information, where the electronic form events are associated with the user accessing the electronic form, compiling the identifying information and the event tracking information into reports, evaluating patterns in the stored one or more of the at least one HTML element, the at least one attribute, and the user-entered text, and providing revisions to the electronic form based at least in part on the evaluated patterns.

In accordance with various embodiments an apparatus to market to consumers with data obtained from abandoned electronic forms is disclosed. The apparatus comprises computer hardware configured to determine that an electronic form accessed by a user has been abandoned by the user, where the electronic form has embedded computer-executable instructions and one or more fields configured to accept user-entered text, and comprises at least one hypertext markup language (HTML) element associated with the one or more fields, where the at least one HTML element has at least one attribute. The apparatus further comprises computer hardware configured to obtain data from the abandoned electronic form with the embedded computer-executable instructions by building a data structure based on the abandoned electronic form and parse the data structure to obtain at the least one HTML element, computer hardware configured to store one or more of the at least one HTML element, the at least one attribute, and the user-entered text, computer hardware configured to determine identifying information of the user based at least in part on the user-entered text, computer hardware configured to identify a preferred communication medium of the user and computer hardware configured to send a personalized message to the user based at least in part on the identifying information via the preferred communication medium to entice the user to complete the electronic form.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 9 illustrates exemplary data scraping script, according to certain embodiments.

DETAILED DESCRIPTION OF SPECIFIC EMBODIMENTS

The present invention comprises a computer-implemented identification and marketing service that identifies consumers or website visitors that fail to complete an electronic form and permits marketing, such as targeted or personalized marketing, to these visitors. The identification and marketing service markets or remarkets in real time or approximately real time to the website visitors and tracks the website visitors as they access the electronic forms. The identification and marketing service advantageously enables business entities to reach lost consumers with marketing and enticements to induce the consumer to not only complete the electronic form, but to become a repeat customer. Further, the identification and marketing service provides the business entities with reports in real time or near real time showing what the visitors are choosing and abandoning.

Figure 1:
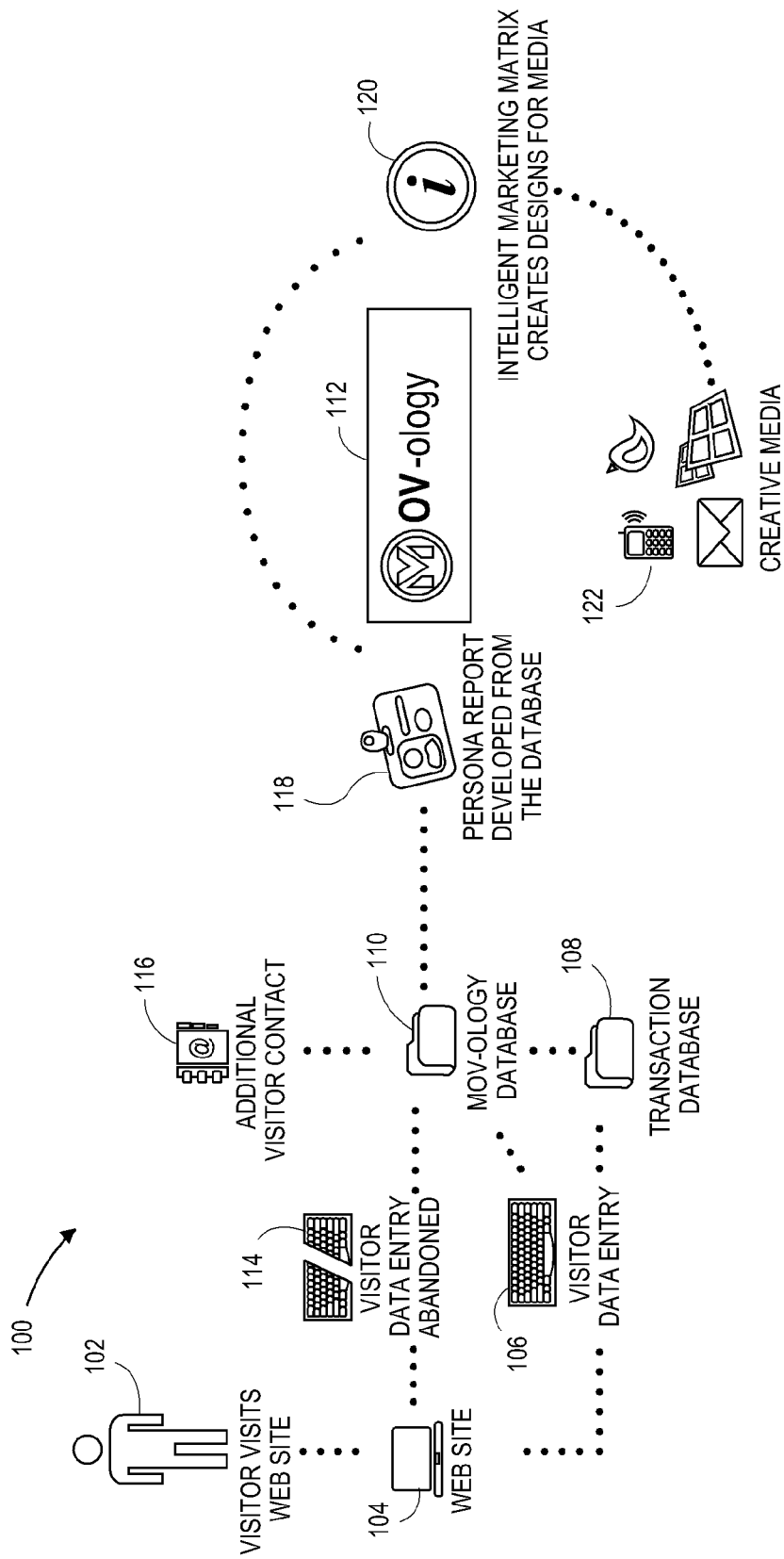
FIG. 1 illustrates one embodiment of a visitor identification and marketing system.

For a more detailed understanding of the invention, reference is first made to FIG. 1. FIG. 1 illustrates one embodiment of a visitor identification and marketing system 100. In an embodiment, a website visitor 102 accesses a website 104 and begins the process of completing one or more electronic or computer-generated forms associated with a business entity. The website 104 may be provided by the business entity or a third party associated with the business entity. The visitor 102 may enter an email address or other personal information into the electronic form.

The visitor 102 may complete the form, as indicated by item 106 in FIG. 1. The data from the completed form is saved in a transaction database 108 and in an identification and marketing database 110 of an identification and marketing service 112. In one embodiment, the data is scraped from the form to extract the data from the form and the scraped data is saved in the databases 108, 110. In an embodiment, the business entity saves the visitor data from the completed form in the transaction database 108. In another embodiment, the identification and marketing service 112 saves the visitor data from the completed form in the transaction database 108. In yet another embodiment, a third party saves the visitor data from the completed form in the transaction database 108.

Other times, at some point in the process, the visitor 102 may fail to complete the one or more electronic forms, as indicated by item 114 in FIG. 1. The determination that the visitor 102 abandoned the form can be based on a variety of factors including length of time, leaving the website, canceling the transaction, failure to input needed data, etc.

The identification and marketing service 112 scrapes the visitor data from the incomplete one or more electronic forms and saves the scraped data in the identification and marketing database 110. In an embodiment, the identification and marketing service 112 uses novel data scraping script to scrape the data. In a further embodiment, the identification and marketing system 112 accesses the transaction database 108 to obtain past transactional information. This data can include, by way of example, a user's email address, a user's name, ZIP Code, or other personal information, the visitor's IP address, and the like.

The identification and marketing system 112 may use one or more of data associated with the abandoned electronic form in the identification and marketing database 110, data associated with past complete transactions in the transactional database 108, and data from third party databases to determine the identity of the visitor 102. The system 100 may provide the identity of the lost visitor 102 to the website provider, such as the business entity. In other embodiments, the visitor's identity can be used by the identification and marketing service 112, the business entity, or a third party to better market goods and services to the lost visitor. In one embodiment, the identification and marketing service 112 provides additional visitor contact 116 to the visitor 102. In some embodiments, the additional visitor contact 116 is provided when the determination is made that the visitor 102 has abandoned the electronic form. In other embodiments, the additional visitor contact 116 is provided later. In further embodiments, the additional visitor contact 116 is provided before the determination is made that the visitor 102 has abandoned the electronic form.

If the visitor 102 accesses the electronic form, but enters no information on the electronic form, the identification and marketing service 112 provides the additional marketing contact 116 using visitor's Internet Protocol (IP) address or using any information that is associated with the visitor's IP address.

In other embodiments, the identification and marketing service 112 provides a personal attribute report 118 developed from the identification and marketing database 110 and the transactional database 108. In an embodiment, the personal attribute report 118 comprises the visitor's public social profile, home ownership status, salary, family history, purchase patterns, and the like.

In one embodiment, the system 110 further comprises an intelligent marketing matrix module 120 that is configured to determine a preferred method of communication. In an embodiment, the personal attribute report 118, as well as data from the databases 108, 110 can be used by the identification and marketing service 112 to create the intelligent marketing matrix 120.

The intelligent marketing matrix module 120 is based on a variety of factors including, by way of example, the business entity's or website providers' preferences, historical data indicating methods that have been successful with the lost visitor or successful with other lost consumers, the cost of different marketing methods, etc. For example, the intelligent marketing matrix module 120 will determine whether to send to the lost visitor 102 an email, a text message or short message service (SMS), printed material through direct mail or other marketing methods. In another embodiment, an algorithm associated with the intelligent marketing matrix module 120 will predict what marketing message to send to the visitor on the website or after the visitor leaves the website based on the visitor's behavior as indicated by the scraped data. In an embodiment, the intelligent marketing matrix 120 comprises a predictive, analytic database.

The system 110 then sends to the visitor 102, using one or more of the preferred methods of communication, a reminder, an incentive such as electronic coupon, information about the desired products and services, discount notifications, or an offering for a similar product or service, etc. In an embodiment, an email service provider sends an email to the visitor 102 with a link to return to the webpage to complete the eForm.

Thus, in certain embodiments, the systems and methods determine the identity of lost consumers. In still other embodiments, the systems and methods determine preferred methods of marketing and incentivizing lost consumers to complete the electronic forms. In additional embodiments, the systems and methods generate reports that assist the business entities in not only identifying lost consumers, but also how the business entities can improve the consumer process.

Figure 2:
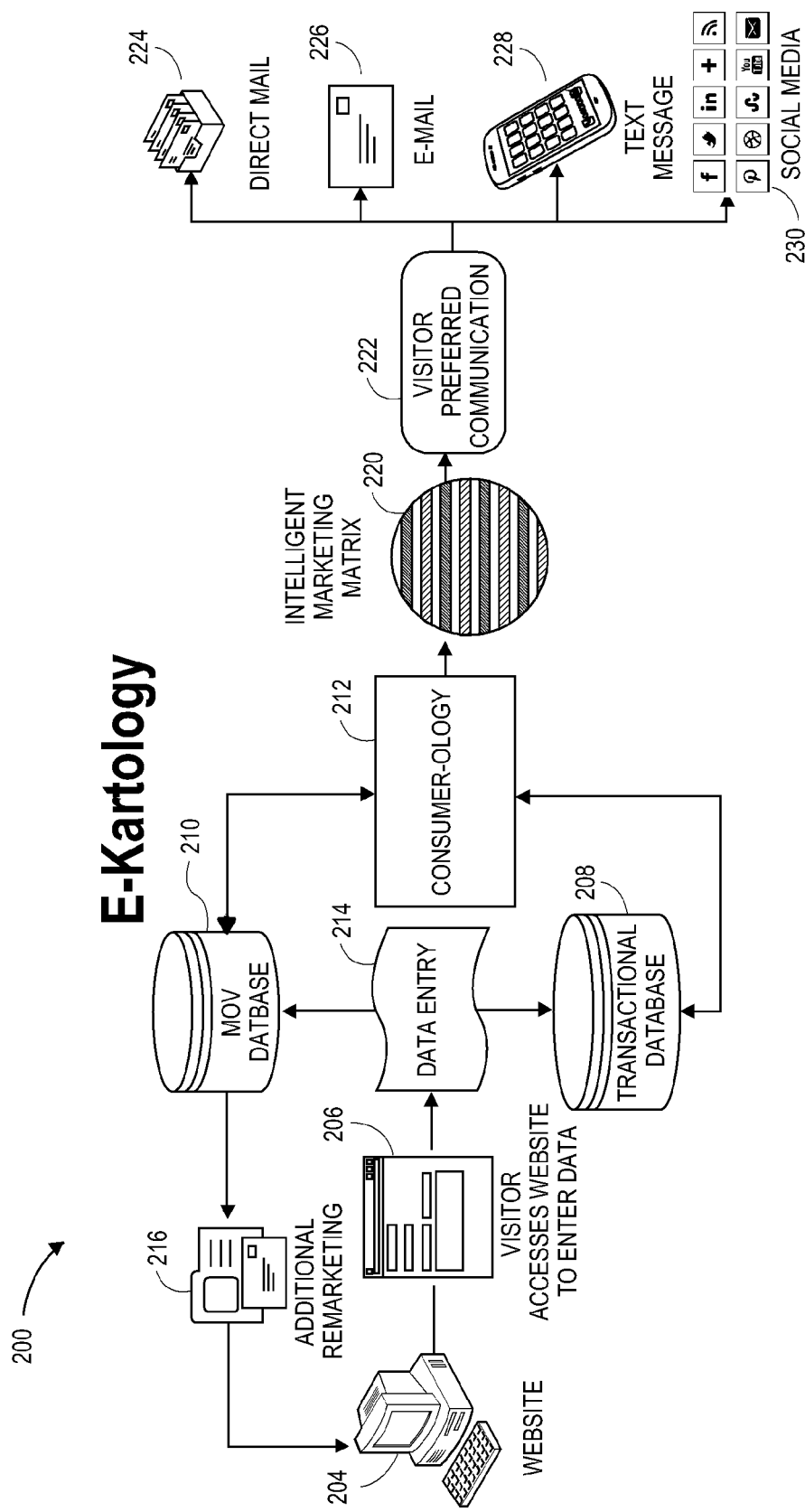
FIG. 2 illustrates another embodiment of a visitor identification and marketing system.

FIG. 2 illustrates another embodiment of a visitor identification and marketing system 200 comprising a website 204, an electronic form 206 accessed via the website 204, a transactional database 208, an identification database 210, an identification and marketing service 212, data 214 entered on the electronic form 206, an intelligent marketing matrix 220, and preferred visitor communication 222, such as direct mail 224, email 226, text message 228, social media 230, or other marketing channel.

A visitor or consumer accesses the website 204 and opens one or more mobile pages, electronic forms or computer generated forms (eForms) 206 associated with a business entity. The visitor enters data 214 into the eForm 206. The data 214 from completed eForms 206 is saved in the transactional database 208. The data 214 from incomplete eForms 206 and/or abandoned eForms 206 is saved in the identification database 210. In an embodiment, the identification and marketing service 212 scrapes the data 214 from the incomplete and/or abandoned eForms 206. The identification and marketing service 212 accesses one or more of the identification database 210, the transactional database 208, and a third party database to identify the visitor. Using the scraped data, the identification and marketing service 212 cross-references any of the scraped data with the data records stored in the databases 208, 210, and any third-party databases to find a match. Once a match is found, the identification and marketing service 212 retrieves identifying information of the visitor from the data records.

Further, the identification and marketing service 212 creates the intelligent marketing matrix 220 to identify the preferred communication media 222 of the identified visitor. The identification and marketing service 212 sends a personalized message to the visitor via the visitor's preferred communication medium 222 to entice the visitor to return to the website 204 and complete the eForm 206. In another embodiment, the identification and marketing service 212 sends a personalized message to the visitor via the visitor's preferred communication medium 222 to introduce the visitor to a product or service of the business entity to replace the product or service associated with the abandoned electronic form. In an embodiment, the visitor receives an email or social media message within one minute. In another embodiment, the visitor receives an email or social media message within one hour.

Figure 3:
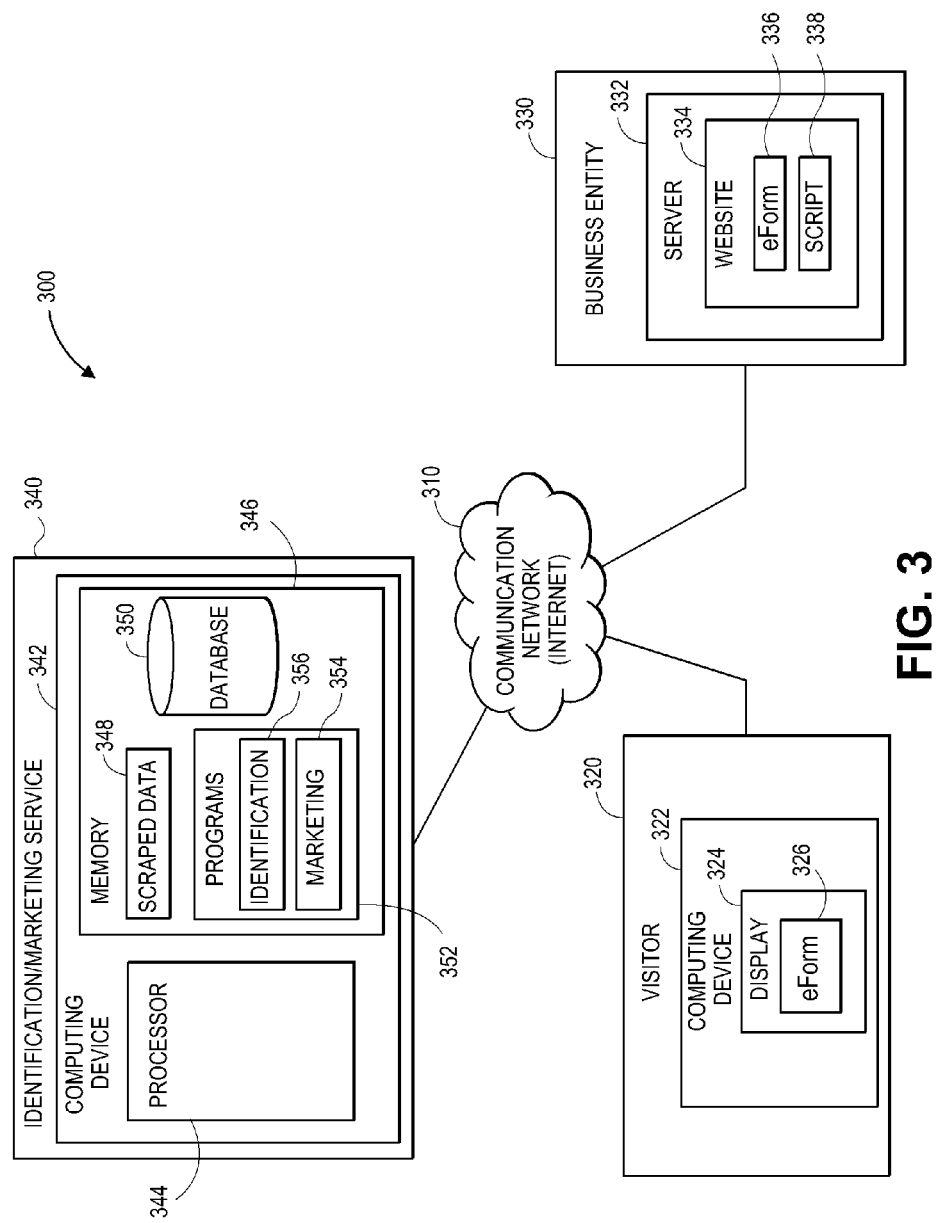
FIG. 3 illustrates the principal components of an embodiment of a system that identifies website visitors using data scraped from visitor accessed electronic forms available on the website.

FIG. 3 illustrates the principal components of an embodiment of a system 300 that identifies visitors to a website using data scraped from visitor accessed electronic forms on the website.

A visitor 320 may be any entity that accesses a website 334 associated with a business entity 330. In order to access the website 334, the visitor preferably uses a web browser, a mobile browser, or an application running on a computing device 322. The computing device 322 can be any device that allows the visitor 320 to interact with the system 300, such as, for example, a conventional computer and modem, a personal computer (PC), an interactive wireless communications device, a laptop, a tablet, a netbook, an iPad, an iPhone, a smartphone, a personal digital assistant, an interactive television, a game console, or the like. The computing device 322 comprises a presentation device 324 configured to present to the visitor 320 an electronic form or eForm 326 requested from the business entity's website 334. For example, the presentation device 324 can be a display configured to visually present the eForm 326 to the visitor 320, a speaker configured to audibly present the eForm 326 to the visitor 320, or the like.

The business entity 330 is any entity that provides an electronic form or eForm 336, either directly or through a third party, accessible to the visitor 320. In an embodiment, the business entity 330 is not limited to entities having a business license and directing their services to consumers. For example, the business entity 330 can be a school and the eForm 326 may be associated with a school fundraiser. In another example, eForm 326 can be associated with a first business entity and directed toward a second business entity. In a further example, the business entity can be a non-profit organization (NPO), a not-for-profit organization, or any such organization where the funds realized in the operation of the organization will not be used to benefit any owners. The business entity 330 comprises or is associated with a server 332, which hosts one or more websites 334. The websites 334 comprise one or more webpages and one or more eForms 336.

The electronic form or eForm 336 comprises a computer program version of a paper form that is accessible from webpages, mobile devices, portals, software applications, and the like. In an embodiment, the eForm 336 does not have a payment gateway and permits online entry of data. In another embodiment, the eForm 336 is any electronic form that does not have a payment gateway. Examples of electronic or computer-generated forms 336 are registration forms, survey forms, marketing research forms, application forms, questionnaires, and the like.

The visitor 320 requests the eForm 336 from the business entity 330 or the third party provider and receives the eForm 336, which is displayed to the visitor as eForm 326. In an embodiment, the eForms 336 comprise unique script 338, which is used to scrape data entered on the eForm 326.

An identification and marketing service 340 is a computer-implemented service that scrapes visitor-entered data from the eForms 326. Further, the identification and marketing service 340 identifies the visitor 320 based at least in part on the scraped data. Further yet, the identification and marketing service 340 provides personalized and targeted marketing to the visitor 320 based at least in part on the scraped data. In a further embodiment, the identification and marketing service 340 provides one or more reports to the business entity 330 based at least in part on the scraped data.

The identification and marketing service 340 comprises a computing device 342 that comprises a processor 344 and memory 346. The processor 344 can comprise controller circuitry, processor circuitry, processors, general-purpose single-chip or multi-chip microprocessors, digital signal processors, embedded microprocessors, microcontrollers, program logic, other substrate configurations representing data and instructions, and the like.

The memory 344 comprises programs 352, such as an identification program 356, a marketing program 354, and the like. The memory 344 further comprises scraped data 348 scraped from the visitor accessed eForm 326, and one or more databases 350. In an embodiment, the scraped data 348 is added to the database 350. The database 350 can comprise one or more logical and/or physical data storage systems for storing data and applications used by the computing device 342.

Each of the functional components of the identification and marketing service 340 may be implemented in program code executed by one or more general or special purpose computers.

In the context of the present disclosure, actions indicated as being taken by the identification and marketing service 340 are preferably performed by or through, as applicable, the identification and marketing service computing device 342 and its associated software components. Actions indicated as being taken by the visitor 320 are preferably performed by or through, as applicable, the visitor computing device 322. Actions indicated as being taken by the business entity 330 are preferably performed by or through, as applicable, the business entity server 332 and its associated software components.

The identification and marketing service computing device 342, the visitor's computing device 322, and the business entity server 332 connect to a communications network 310, which preferably is or includes the Internet.

Figure 4:
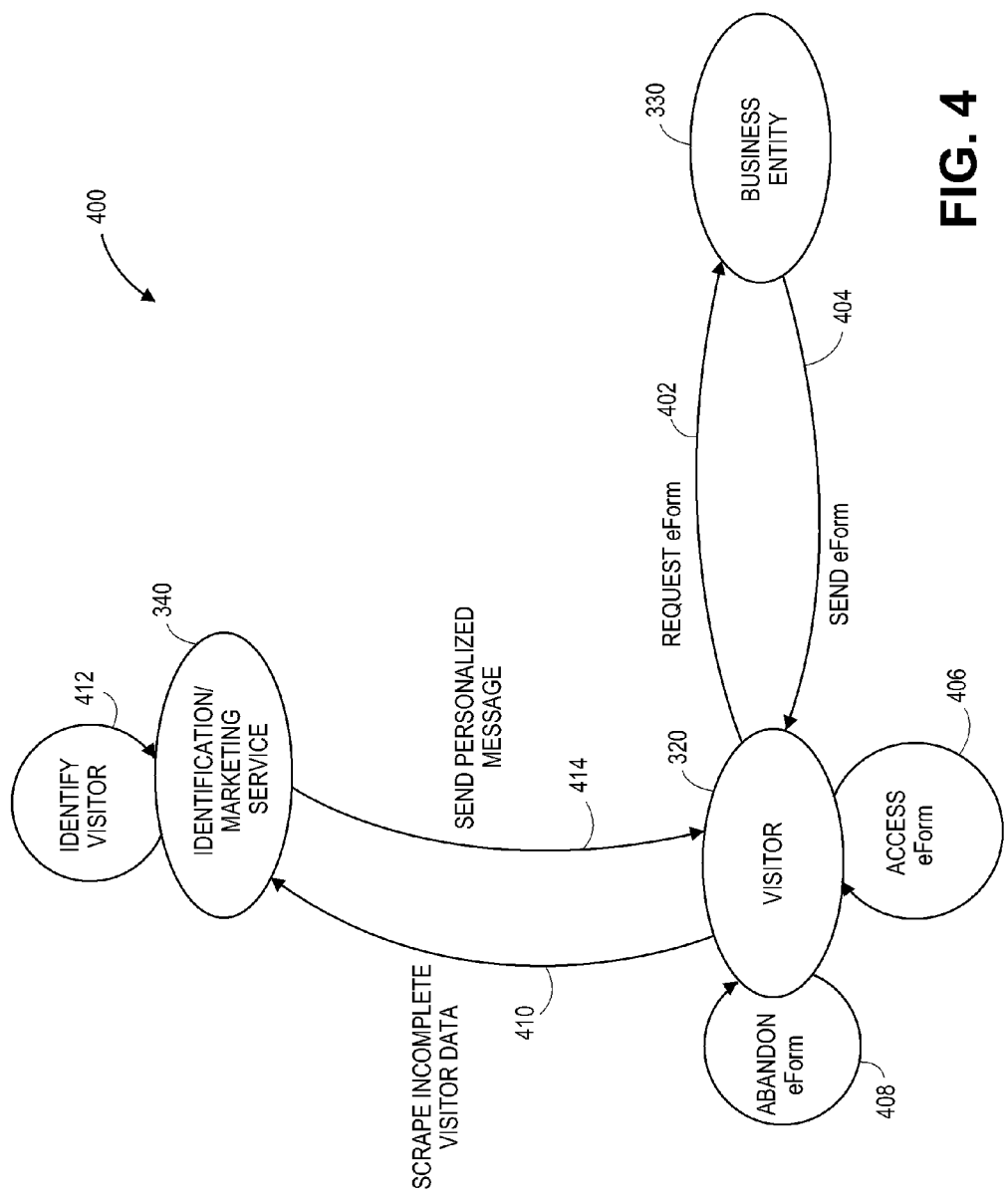
FIG. 4 illustrates a data flow diagram showing the transfer of information between the visitor computer, the business entity server, and the identification/marketing service server, according to certain embodiments.

FIG. 4 illustrates an exemplary data flow diagram 400 showing the transfer of information between the visitor 320, the business entity 330, and the identification/marketing service 340.

At event 402, the visitor 320 through the visitor computing device 322 requests the eForm 336 associated with the business entity 330. At event 404, the business entity 330 hosts the eForm 336 from the website 334 and the server 332 serves the eForm 336 to the visitor computing device 322 where it is displayed on display 324 as the eForm 326.

In an embodiment, the eForm 336 includes the script 338. The script 338 comprises custom code placed on bottom of the website 334 or the website's webpages that scrapes off any identifiable fields, images or text on an electronic form in approximately real time. While a compiled program comprises a sequence of instructions that is executed by a computer processor, a script comprises a program or sequence of instructions that is carried out by another program. Examples of scripting languages are JavaScript®, Perl®, REXX®, and Tcl/Tk®. In an embodiment, the script 338 comprises JavaScript®. A JavaScript® script in a webpage may run "client-side" on the web browser. The script 338 embedded on the webpages comprising the eForm 326, 336 advantageously scrapes data from the eForm 326, 336 without a product feed, and is easy to install and update.

The visitor 320 accesses the eForm 326 at event 406. In some embodiments, the visitor 320 enters at least some data into the eForm 326. The eForm may have entry fields for visitor information, such as name, address, email address, home phone number, cell phone number, work phone number, account number, desired service, income level, age, family size, age of children, and the like. In other embodiments, the visitor 320 does not enter any data into the eForm 326 at event 406.

At event 408, the visitor 320 abandons the eForm 326 before completing the data entry fields and before submitting the eForm 326 to the business entity 330. In an embodiment, an abandon is a visitor 320 that enters information in a form field and does not complete the process by submitting the eForm 326.

At event 410, the data entered by the visitor 320 in the eForm 326 is scraped and sent to the identification and marketing service computing device 342, where it may be stored in the memory 346 as the scraped or captured data 348 and/or the database 350. In an embodiment, as visitors 320 abandon or fill out the eForms 326, the identification and marketing service 340 builds a matrix of the captured data 348. Additionally, any data retrieved from various data sources, such as the third party databases, is appended to the matrix.

In an embodiment, the script 338 embedded in the eForm 326 scrapes the entered data. In other embodiments, the entered data is scraped by web-scraping software. For example, web-scraping software may automatically recognize the data structure of a webpage, provide a recording interface, provide scripting functions that can extract and transform content, and provide database interfaces that can store the scraped data 348 in databases.

In another embodiment, the entered data is scraped by text grepping and regular expression matching. For example, the UNIX® grep command or regular expression-matching facilities of programming languages, such as Perl® or Python®, extracts information from webpages.

In a further embodiment, Hypertext Transfer Protocol (HTTP) programming can scrape the entered data. For example, sending HTTP GET requests or POST requests to a server to retrieve the contents of that server can provide scraped data.

In yet other embodiments, HyperText Markup Language (HTML) parsers can scrape the entered data. For example, after a webpage renders, an HTML parser parses the rendered webpage as if it is a browser and then grabs the data after the webpage has fully loaded.

Vertical aggregation platforms can be used in other embodiments. These platforms create and monitor a multitude of "bots" for specific verticals with no man-in-the-loop and no work related to a specific target site. The preparation involves establishing the knowledge base for the entire vertical and then the platform creates the bots automatically. The platform's robustness is measured by the quality of the information it retrieves (usually number of fields) and its scalability (how quick it can scale up to hundreds or thousands of sites).

In some embodiments, Document Object Model (DOM) parsing is used to scrape the entered data. DOM parsing can use a web browser to retrieve the content and dynamic content on a webpage. The parser then parses the DOM to extract elements.

In another embodiment, the entered data is scraped using semantic annotation recognizing. The webpages being scraped may embrace metadata or semantic markups and annotations, which can be used to locate specific data snippets. If the annotations are embedded in the webpages, this technique can be viewed as a special case of DOM parsing. In another case, the annotations, organized into a semantic layer, are stored and managed separately from the webpages, so the scrapers can retrieve data schema and instructions from this layer before scraping the pages.

In a further embodiment, the entered data is scraped by computer vision web-page analyzers, which identify and extract information from webpages by interpreting pages visually as a human being might.

In other embodiments, iris/eye recognition scraping uses augmented reality (AR) and virtual reality (VR) iris tracking combined with collecting data through visual location awareness and analytical association, and Beautiful Soup parses HTML documents to create a parse tree for parsed pages that can be used to extract data from HTML.

In other embodiments, cascading style sheets (CSS) scraping uses the CSS selectors to scrape webpage data. A non-limiting example of CSS scraping implemented on a node.js software platform is illustrated in Example 1 and a non-limiting example of CSS scraping written in Python® programming language is illustrated in Example 2. In other embodiments, CSS scraping is implemented on other software platforms.

Example 1

CSS Selectors in Node.JS

```
var url = 'http://police.uk/data';
// holder for results
var out = {
    'streets': [ ]
}
jsdom.env({
    html: url,
    scripts: [
        'http://code.jquery.com/jquery.js'
    ],
    done: function(errors, window) {
        var $ = window.$;
        // find all the html links to the street zip files
```

-continued

```
        $('#downloads .months table tr td:nth-child(2) a').each(function(idx, elem) {
            // push the url (href attribute) onto the list
            out['streets'].push( $(elem).attr('href') );
        });
    });
});
```

Example 2

CSS Selectors in Python®

```
import lxml.html
from lxml.cssselect import CSSSelector
# get some html import requests
r = requests.get('http://url.to.website/')
# build the DOM Tree
tree = lxml.html.fromstring(r.text)
# print the parsed DOM Tree
print lxml.html.tostring(tree)
# construct a CSS Selector
sel = CSSSelector('div.foo li a')
# Apply the selector to the DOM tree.
results = sel(tree)
print results
# print the HTML for the first result.
match = results[0]
print lxml.html.tostring(match)
# get the href attribute of the first result
print match.get('href')
# print the text of the first result.
print match.text
# get the text out of all the results
data = [result.text for result in results]
```

At event 412, the identification and marketing service 340 identifies the visitor 320 based at least in part on the scraped data 348. In one embodiment, the identification and marketing service 340 retrieves identifying information associated with the visitor 320 in the identification database 350 based on at least a part of the scraped data 348. In another embodiment, the identification and marketing service 340 retrieves identifying information associated with the visitor 320 in third party databases based on at least a part of the scraped data 348. In a further embodiment, the identification and marketing service 340 retrieves or captures identifying information associated with the visitor 320 that it has been approved to capture from the identification database 350, any third-party databases, and the like.

Examples of identifying information are name, address, email address, home phone number, cell phone number, work phone number, account number, desired service, income level, age, family size, age of children, employer, and the like. Other examples of identifying information may include social media accounts associated with a social media service or social networking service, such as, for example, Facebook®, Twitter®, OpenID®, Google+®, MySpace®, Bebo®, Friendster®, hi5®, Orkut®, PerfSpot®, Zorpia®, Netlog® Habbo®, and the like. Additional examples of identifying information may include addresses of webmail services, such as Gmail™, AOL® mail, Yahoo! ® Mail, Hotmail®, Blue Tie®, Zoho® Mail, AIM® Mail, Mail.com®, Gawab.com®, FastMail®, and the like.

Further, the identifying information may comprise data indicating a preferred method of contacting the visitor. For example, a third-party database may comprise information relating to an analysis of consumer behavior that determines the likelihood a consumer will respond to a direct mail piece versus an email.

At event 414, the identification and marketing service 340 sends a personalized message to the visitor 320 using the identified preferred method of communicating with the visitor 320. The personalized message may include coupons and discounts, and the like, to entice the visitor 320 to return to the website 334 and complete the eForm 326. The personalized message or recovery message may include advertisements associated with the eForm 326 or may include related information associated with the business entity 330, such as a link to the business entity 330 online. In an embodiment, the system 400 sends the personalized messages according to contact rules. In another embodiment, the personalized message is sent in real time or as soon as the identification and marketing service 340 determines that the visitor abandoned the eForm 326, as most form abandon leads may go cold with an hour.

In an embodiment, the personalized messages are sent to the visitor 320 at the time or at approximately the time the visitor 320 abandons the eForm 326. In other embodiments, the personalized messages are sent to the visitor 320 at any time the visitor 320 is accessing the eForm 326. In further embodiments, the personalized messages are sent later.

The visitor 320 receiving the personalized message, can, for example, click through to the eForm 326, open the message, go directly to the business entity's website 334, or the like.

Figure 5:
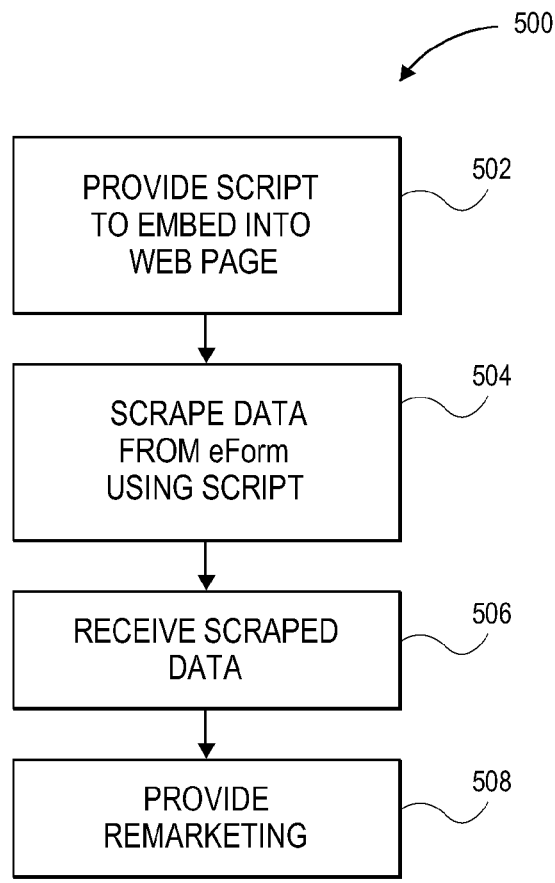
FIG. 5 is a flow chart illustrating a process to identify and to market to visitors accessing an electronic form, according to certain embodiments.

FIG. 5 is a flow chart illustrating an exemplary process 500 to identify and market to visitors accessing an electronic form. At block 502, the script 338 is provided to the business entity 330 or to a third party associated with the business entity 330 to embed into the webpages including the eForm 336 found at the website 334. In an embodiment, the identification and marketing service 340 provides the script 338. In another embodiment, the identification and marketing service 340 provides custom JavaScript® to embed into the webpages found at the website 334.

At block 504, the script 338 scrapes data from the eForm 326, and at block 506, the scraped data 348 is received by the identification and marketing service 340.

At block 508, the identification and marketing service 340 provides remarketing to the visitor 320. In an embodiment, one or more of the type of remarketing, the content of the remarketing, the address of the recipient of the remarketing, the name of the recipient of the remarketing are based at least in part on the scraped data 348. Examples of remarketing are direct mailings, social media messages, email messages, and the like, that are directed to enticing the visitor 320 to return to the business entity's website 334. If the visitor 320 abandoned the eForm 326, the remarketing may include information that is deemed to be of greater interest to the visitor 320 than that of the website 334.

Figure 6:
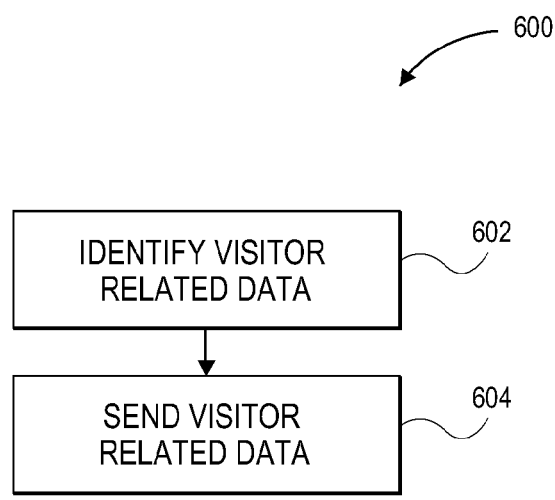
FIG. 6 is a flow chart illustrating a process to compile identified visitor data, according to certain embodiments.

FIG. 6 is a flow chart illustrating an exemplary process 600 to compile identified data. In addition to using the identified data to remarket or market to the visitor 320, business entities 330 are also interested in the statistics and analytics associated with the visitors 320 to their websites 334. While the business entity 330 may be able to retrieve such information from completed eForms that are returned, the business entity 330 has no direct way to know how many eForms 326 were accessed and abandoned, who abandoned the eForms 326, and the like.

At block 602, the identification and marketing service 340 identifies the visitor 320 based at least in part on the data scraped from the eForm 326. The visitor identification is associated with identifying information stored in one or more of the database 350 and third party databases.

In addition to receiving the data scraped from the eForm 326, the identification and marketing service 340 may track eForm events that are associated with the visitor 320 accessing the eForm 326, 336. In an embodiment, the eForm tracking events are performed by the visitor 320. In other embodiments, the eForm tracking events are performed by the scraping method and/or the identification and marketing service 340. In further embodiments, the eForm events can be associated with the forms of visitor engagements, such as email, phone calls, social media messages, direct mailings, and the like. Examples of eForm tracking events are:

- The visitor selects an eForm field.
- The visitor enters information into the eForm field.
- The visitor updates the information in the eForm field.
- The scraping method or the identification and marketing service captures the visitor's first name.
- The scraping method or the identification and marketing service captures the visitor's last name.
- The scraping method or the identification and marketing service captures the visitor's full name.
- The visitor completes the form.
- The scraping method or the identification and marketing service captures a hidden field on the eForm.
- The visitor completes the eForm and clicks on a remarketing message link.
- The visitor revises the eForm.
- The visitor refreshes the eForm.
- The visitor visits the eForm for the first time.
- The visitor engages with the eForm.
- The visitor has been marked as not remarketable. Examples of visitors that are not remarketable are visitors with invalid contact information, visitors that opted out on the website, visitors that failed the riles or filter requirements, visitors that previously selected unsubscribe, visitors that complete and submit the eForm, and the like.
- The visitor abandons the eForm.
- The visitor attempts to submit the eForm with an error, or other usability events.

In an embodiment, each event is tracked with one or more of an IP address, a user agent, a timestamp, and the like. In other embodiments, the identification and marketing service 340 uses Node.JS determine whether the visitor 320 is still accessing the website 334 or has left the website 334. In another embodiment, the identification and marketing service 340 tracks at least one, more than one, or every webpage the visitor 320 visits. Further, the identification and marketing service 340 may capture the quantity and type of message sent to the visitor 320, the message-opening event, click through events, which links were clicks, the frequency of the abandoned fields, and the like.

When the visitor has been sent a remarketing email, the identification and marketing service 340 may track email events such as when the visitor 320 opens the email, when the visitor 320 clicks on a link in the email, the bounce type identifying why an email is undeliverable, when the email is successfully sent, when the visitor "unsubscribes", and the like. The email events can be tracked with a timestamp. The identification and marketing service 340 may also capture return visitor data, such as whether the visitor 320 returned to the webpage from a remarketing email, whether the visitor 320 opens the email and returned to the webpage by entering the web address in the browser, whether the visitor 320 returned to the webpage in response to other marketing that was deployed.

Further, the identification and marketing service 340 may capture data relating to the number of visitors 320 to a website, the number of visitors 320 that complete an eForm 326, 336, and the number of visitors 320 or abandons that abandon an eForm. There are at least four types of abandons: 1) identified; 2) not identified; 3) identified but not converted; and 4) not identified and not converted. Identified are those visitors 320 that provide sufficient information, such as address, first name, last name, email address, mobile phone number, and the like, such that they can be contacted. Converted are those visitors 320 that return to the website 334 and complete the eForm 326, 336. The identification and marketing service 340 may also capture data relating the types of abandons per completion.

The identification and marketing service 340 may also capture data from saves. A save comprises the visitor 320 that abandons an eForm 326, receives a remarketing message, returns to the webpage, and completes the eForm 326. Data collected on saves may comprise data indicating a preferred method of contacting the visitor and can be used to predict which marketing channel or message media to use to deliver the personalized message. For example, a third-party database may comprise data collected on saves relating to consumer behavior that determines the likelihood a consumer will respond to a direct mail piece versus an email.

At block 604, the identification and marketing service 340 compiles the identifying information and event tracking information to provide reports to the business entity 330 and/or to third parties associated with the business entity 330.

For example, the reports can report for trends, how many times a visitor 320 has applied, at which eForm fields the visitor abandoned the eForm, triggers that caused form abandonment, suggested eForm changes to retain visitors, and the like. Further, the identification and marketing service 340 can utilize data scraped from other eForms associated with the business entity 330 to provide trends across more than a single website 334. Examples of the categories of reported data are visitor data, revisit data abandonment data, saved data, completed transaction data, top completed data, top abandoned data, top saved data, completed fields for eForms data, and messages data.

For example, the visitor data may comprise one or more of the gross number of visitors for the website of the date range selected, the average number of visitors for the website for the date range selected, the number of unique visitors to the website, an increase or decrease in the gross, average or unique visitors, and the like.

For example, the revisit data may comprise one or more of the gross number of returned visitors for the website for the date range selected, the average number of returned visitors for the website for the date range selected, the number of unique visitors to the website, an increase or decrease in the gross, average or unique returned visitors, and the like.

For example, the abandonment data may comprise one or more of the gross number of abandons for the website for the date range selected, the average number of abandons for the website for the date range selected, the ratio of the number of gross abandons to the number of total visitors, the number of unidentified abandons for the website for the date range selected, number of identified visitors who have been identified as abandoned, the monetary value of the abandons, the unidentified abandons or the identified abandons, any increase or decrease in any of the abandonment data, and the like.

For example, the saved data may comprise one or more of the gross number, average number, or number of unique visitors for direct save visitors, influenced save visitors, and aware save visitors, as well as the monetary value and any increase or decrease associated with these visitors for the website for the date range selected, In an embodiment, a direct save visitor comprises a visitor who abandoned an eForm, triggered and received at least one re-marketing email, clicked a link that returns the visitor back to the eForm within the re-marketing email within 24 hours after the link was clicked. In an embodiment, a influenced save visitor comprises a visitor who has abandoned an eForm, triggered and received at least one re-marketing event, opened the email, or clicked the link that returns the visitor back to the eForm within the re-marketing email, within 5 days of opening email or clicking the link. In an embodiment, an aware save visitor comprises a visitor who has abandoned an eForm, triggered and received at least one re-marketing email, opened the email or clicked the link that returns the visitor back to the form within the re-marketing email after 5 days of opening email or clicking the link.

In an embodiment completed transactions data comprises one or more of the gross number or average number of completed transactions for the website for the date range selected, the monetary value of the completed transactions, any increase or decrease associated with these visitors, and the like.

In an embodiment, the top completed data comprises on or more of a list from most completed to least completed of the total number of times an eForm was completed based on the selected date range, any change in rankings, and the like. In an embodiment, the top abandoned data comprises one or more of a list from most accessed to least accessed eForms abandoned from the selected date range, any change in rankings, and the like.

In an embodiment, the top saved data comprises one or more of a list from most to least the total number of times an eForm was saved (all 3 types) for the selected date range, the gross number of times the eForm was saved for the selected date range, any change in rankings, and the like.

In an embodiment, the completed fields for eForm data comprises one or more of a list from least to greatest of the number of times a field was started for the selected date range, the gross number times a field was started for the selected date range, any change in rankings, and the like.

In an embodiment, the messages data comprises one or more of the gross number of unique opens for the selected date range, the average number of unique opens for the selected date range, the unique number of clicks of links that return to the website, any increase or decrease, and the like.

In another embodiment, the visitor may submit the eForm 326 without completing all of the data entry fields. In such cases, the identification and marketing service 340 uses the scraped data 348 to retrieve the identifying information associated with the visitor 320 and can provide the missing information to the business entity 330 associated with the form 326, 336.

In yet another embodiment, the identification and marketing service 340 receives social media information associated with the business entity 330 from the social media site accessed by the visitor 320. For example, when the visitor 320 uses a Facebook® button to "like" the business entity 330 or an eForm 326, 336 associated with the business entity 330, the data is correlated in real time with 1) the visitor's in-session browsing behavior; 2) the visitor's recent eForm accesses and/or submissions; and 3) whether the business entity 330 and/or the eForm associated with the business entity 330 that the visitor 320 'likes' is 'hot' at that moment in time. The data is then used to determine the "next best action," which might include a one-to-one campaign relevant just for that individual 320—in real time or near real time versus days later when the visitor 320 may no longer be searching for the eForm 326, 336. In an embodiment, the visitor 320 receives an email or social media message with one minute. In another embodiment, the visitor 320 receives an email or social media message with one hour.

Figure 7:
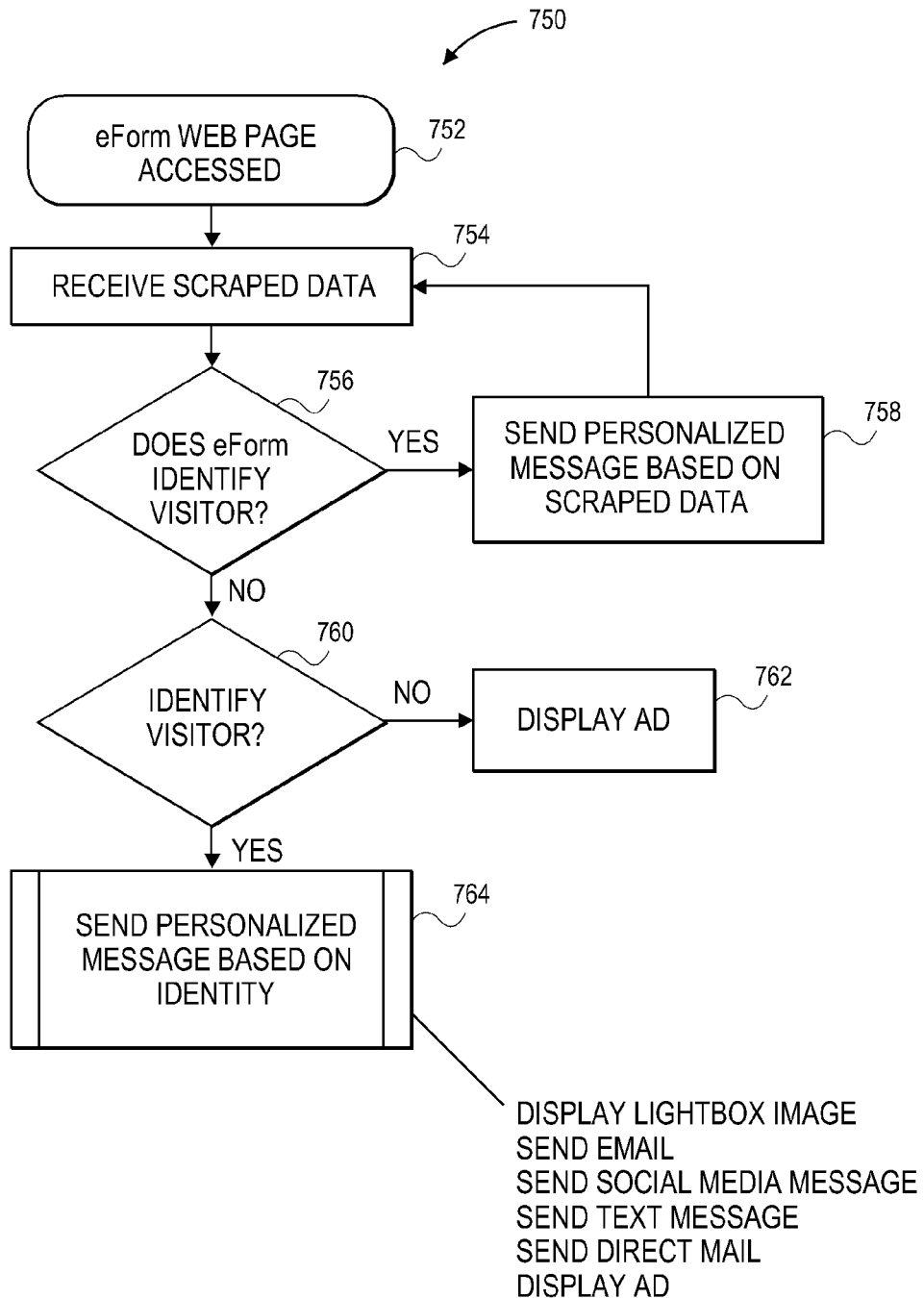
FIG. 7 is a flow chart illustrating a process to send personalized messages to website visitors, according to certain embodiments.

FIG. 7 is a flow chart illustrating an exemplary process 750 to send personalized messages to the website visitor 320. At block 752, the visitor 320 accesses the eForm 326, 336 from the business entity's website 334. At block 754, the identification and marketing service 340 receives the scraped data 348.

In some circumstances, the visitor 320 completes certain fields on the eForm 326, such as name, address, email address, etc., that identify the visitor 320. If, at block 756, the scraped data 348 identifies the visitor 320, the process 750 moves to block 758 where a personalized message is sent to the visitor 320. In an embodiment, the personalized message is sent via the visitor's preferred communication method.

From block 758, the process 750 returns to block 754 to receive additional scraped data.

At other times, the visitor 320 may not complete any fields on the eForm 326, 336 or insufficient fields to permit identification of the visitor 320 from the scraped data 348. If, at block 756, the scraped data 348 alone is insufficient to identify the visitor 320, the process 750 moves to block 760. At block 760, the scraped data 348 is used to look up and retrieve identifying information in the identification database 350. In other embodiments, third party databases are accessed to find and to retrieve identifying information based at least in part on the scraped data 348.

If the visitor cannot be identified, the process 752 displays an advertisement to the visitor 320 using the Internet Protocol (IP) address of the computing device 322 that was used to access the eForm 326.

If the system 750 retrieves identifying information from the database 350 or third party databases, the identification and marketing service 340 sends a personalized message to the visitor 320 at block 764. The personalized message may be send by one or more of displaying a lightbox advertisement to display an image on the computing device 322, sending an email to one or more identified email accounts, sending a social media message to one or more identified social media accounts, sending a text message to one or more identified cell phones, sending direct mail to the visitor's address, and displaying an advertisement on the display 324.

Figure 8:
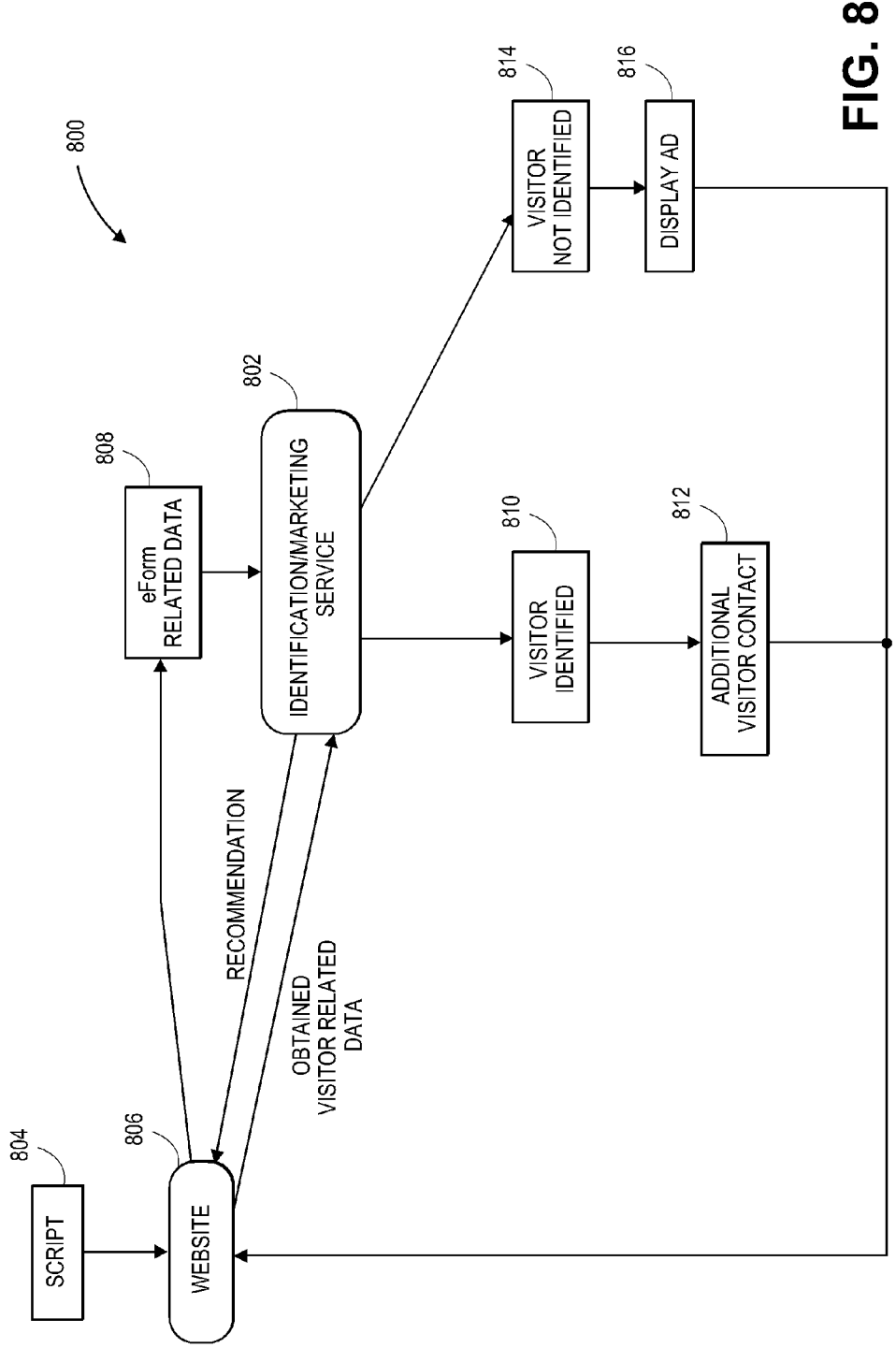
FIG. 8 illustrates an embodiment of identification marketing service functionality.

FIG. 8 is a block diagram 800 illustrating functionality associated with an embodiment of an identification and marketing service 802. In an embodiment, script 804 is embedded in webpages including eForms of a website 806. The eForms are accessed by a visitor or consumer. In one embodiment, the script 804 scrapes data from the eForm. In other embodiments, other methods, such as web-scraping software, text grepping and regular expression matching, HTTP programming, HTML parsing, DOM parsing, vertical aggregation platforms, semantic annotation recognition, computer vision web-page analyzers, and the like, are employed to scrape data from the eForm, as described herein.

The identification and marketing service 802 receives visitor related data obtained from the website 806. Further, the identification and marketing service 802 receives eForm related data 808 where the eForm related data is based at least in part on information from the website 806.

In an embodiment, the identification and marketing service 802 provides a recommendation to the visitor via the website 806. The recommendation may be based at least in part on the obtained visitor related data, on the eForm related data 808, or on both the obtained visitor related data and the eForm related data 808.

In some embodiments, the identification and marketing service 802 identifies the visitor 810 and sends an additional visitor contact 812 to the visitor to entice the visitor to stay at or return to the website 806.

In other embodiments, the visitor cannot be identified 814 and the identification and marketing service 802 displays an advertisement on the visitor's display device or sends an advertisement using the visitor's IP address to entice the visitor to stay at or return to the website 806.

FIG. 9 illustrates exemplary data scraping script 900 comprising a plurality of code lines 902-912. In an embodiment data scraping is a technique in which a computer program extracts data from human-readable output coming from another program. The script 900 can be placed anywhere on at least one of the webpages of the website. In an embodiment, the script 900 is placed on each webpage of the website. In an embodiment, the script 900 is placed between the <head> tags at the top of the webpages. In another embodiment, the script 900 is placed at the bottom of the webpage before closing the <body> tag. Embodiments of the data scraping script are unique to each web property.

The illustrated embodiment of FIG. 9 comprises an example of a generic JavaScript. Start line 902 comprises comments and has no action. Line 904 comprises an opening JavaScript tag that identifies the script type as JavaScript. At line 906, the document.location.protocol obtains the protocol of the current webpage and line 908 writes the script tag on the webpage. The script tag places or loads the JavaScript file on the webpage. Line 910 ends the JavaScript tag and end line 912 comprises comments and has no action. In an embodiment, the script 900 is placed on each eForm page of the website to scrape or obtain data from the eForm as it is entered.

Figure 10:
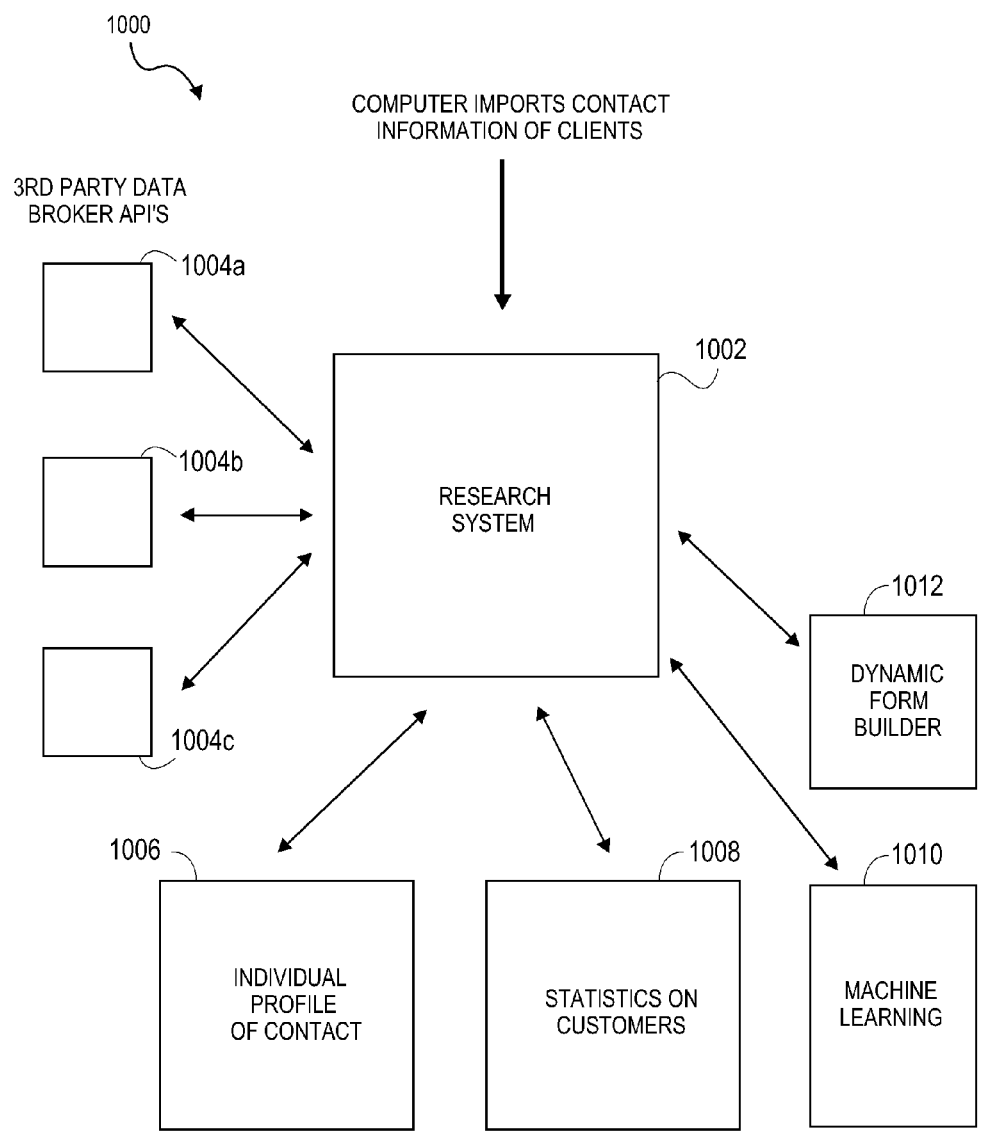
FIG. 10 illustrates an exemplary consumer analytics system, according to certain embodiments.

FIG. 10 illustrates a consumer analytics system 1000 comprising a research system 1002, one or more third party databases 1004a, 1004b, 1004c, a contact profile 1006, consumer statistics 1008, a machine learning system 1010, and a dynamic form builder 1012. The consumer analytics system 1000 researches visitors to a business entity's website and/or to a business entity's eForm and provides analytics to the business entity derived from the visitor information. The research system 1002 accesses the one or more third party databases 1004a, 1004b, 1004c. In an embodiment, the one or more third party databases 1004a, 1004b, 1004c comprise one or more data brokering services that store information about people. The research system 1002 send publically available information about the visitor such as, for example, a first name, a last name, an email address, or the like to the one or more third party databases 1004a, 1004b, 1004c. In an embodiment, the visitor's first name, last name, or email address is obtained by the research system 1002 from the business entity's eForms. In an embodiment, the obtained data is scraped from the business entity's eForm. In another embodiment, the information and marketing service 340 comprises the research system 1002.

The one or more third party databases 1004a, 1004b, 1004c retrieve information stored in the databases 1004a, 1004b, 1004c that is associated with the visitor based on the publically available information sent by the research system 1002. The retrieved information is sent to the research system 1002. Examples of the retrieved information are the visitor's public social profile, home ownership status, salary, family history, purchase patterns, and the like. The research system 1002 stores the retrieved information.

In one embodiment, the research system 1002 creates the contact profile of the visitor based at least in part on the visitor's retrieved information and the visitor information obtained from the business entity's eForm. In another embodiment, the research system 1002 analyzes the retrieved information from a plurality of visitors (the collective information) and provides statistics based on the collective information.

In another embodiment, the statistics are displayed in a way that is helpful to market to the plurality of visitors. In further embodiment, the consumer analytics system 1000 allows the research system 1002 to upload contact information, such as email addresses, first names, and last names, from a collection of visitor contacts associated with the business entity. The research system 1002 processes the contact information to provide the business entity with one or more statistics on the collection of visitor contacts.

The research system 1002 interfaces with the machine learning system 1010 to evaluate recognizable patterns in visitor or customer data to improve the visitor's profile information, to provide marketing recommendations, to take actions, to remarket, to improving marketing techniques, and the like. The research system 1002 receives information from the machine learning system 1010. In an embodiment, the research system 1002 stores the information. In another embodiment, the research system 1002 processes or reacts to the information.

The dynamic form builder 1012 interfaces with the research system 1002 to revise eForms or to suggest revisions to eForms. The dynamic form builder 1012 creates or removes eForm inputs or fields based at least in part on visitor inputs, such as, for example, information, timing, lack of input on specific fields, and the like, and visitor information. For example, the dynamic form builder 1012 determines questions with a high likelihood of visitor response and questions with a low likelihood of visitor response based on the industry associated with the business entity, information desired by the business entity or a client associated with the business entity, such as, for example, visitor input, visitor information, and the like.

Terminology

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

All of the processes and steps described above as being implemented by the identification and marketing service may be performed and fully automated by a computer system. The computer system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various identification and marketing service functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips and/or magnetic disks, into a different state.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combinations of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure.

What is claimed is:

1. A method to market to consumers with data obtained from abandoned electronic forms, the method comprising:
    determining that an electronic form accessed by a user has been abandoned by the user, the electronic form having embedded computer-executable instructions and one or more fields configured to accept user-entered text, the electronic form comprising at least one hypertext markup language (HTML) element associated with the one or more fields, the at least one HTML element having at least one attribute;
    obtaining data from the abandoned electronic form with the embedded computer-executable instructions by building a data structure based on the abandoned electronic form;
    parsing the data structure to obtain the at least one HTML element;
    storing one or more of the at least one HTML element, the at least one attribute, and the user-entered text;
    determining identifying information of the user based at least in part on the user-entered text;
    identifying a preferred communication medium of the user; and
    sending a personalized message to the user based at least in part on the identifying information via the preferred communication medium to entice the user to complete the electronic form.

2. The method of claim 1 further comprising sending a message to the Internet protocol (IP) address associated with a computing device used to access the electronic form when the identifying information of the user cannot be determined.

3. The method of claim 1 wherein the preferred communication medium comprises one or more of an email, a text message, printed material sent through direct mail, and a message on a social media site.

4. The method of claim 1 wherein the personalized message comprises one or more of a coupon, a reminder, information related to the electronic form, discount notifications, an offering related to the electronic form, a link to return to a webpage comprising the electronic form, a lightbox image, and an advertisement.

5. The method of claim 1 wherein the personalized message is sent to the user within approximately one minute after determining that the user abandoned the electronic form.

6. The method of claim 1 further comprising tracking electronic form events with one or more of an IP address, a user agent, and a timestamp to create event tracking information, the electronic form events associated with the user accessing the electronic form.

7. The method of claim 6 further comprising compiling the identifying information and the event tracking information into reports.

8. The method of claim 1 further comprising evaluating patterns in the stored one or more of the at least one HTML element, the at least one attribute, and the user-entered text.

9. The method of claim 8 further comprising providing revisions to the electronic form based at least in part on the evaluated patterns.

10. An apparatus to market to consumers with data obtained from abandoned electronic forms, the apparatus comprising:
    computer hardware configured to determine that an electronic form accessed by a user has been abandoned by the user, the electronic form having embedded computer-executable instructions and one or more fields configured to accept user-entered text, the electronic form comprising at least one hypertext markup language (HTML) element associated with the one or more fields, the at least one HTML element having at least one attribute;
    computer hardware configured to obtain data from the abandoned electronic form with the embedded computer-executable instructions by building a data structure based on the abandoned electronic form and parse the data structure to obtain at the at least one HTML element;
    computer hardware configured to store one or more of the at least one HTML element, the at least one attribute, and the user-entered text;
    computer hardware configured to determine identifying information of the user based at least in part on the user-entered text;
    computer hardware configured to identify a preferred communication medium of the user; and
    computer hardware configured to send a personalized message to the user based at least in part on the identifying information via the preferred communication medium to entice the user to complete the electronic form.

11. The apparatus of claim 10 further comprising computer hardware configured to send a message to the Internet protocol (IP) address associated with a computing device used to access the electronic form when the identifying information of the user cannot be determined.

12. The apparatus of claim 10 wherein the preferred communication medium comprises one or more of an email, a text message, printed material sent through direct mail, and a message on a social media site.

13. The apparatus of claim 10 wherein the personalized message comprises one or more of a coupon, a reminder, information related to the electronic form, discount notifications, an offering related to the electronic form, a link to return to a webpage comprising the electronic form, a lightbox image, and an advertisement.

14. The apparatus of claim 10 wherein the personalized message is sent to the user within approximately one minute after determining that the user abandoned the electronic form.

\* \* \* \* \*